United States Patent
Dearing et al.

(10) Patent No.: US 11,468,396 B2
(45) Date of Patent: *Oct. 11, 2022

(54) SYSTEM AND METHOD FOR DYNAMICALLY ROUTING ITEMS

(71) Applicant: United States Postal Service, Washington, DC (US)

(72) Inventors: Stephen M. Dearing, Herndon, VA (US); C. Scot Atkins, Chantilly, VA (US); James DeForrest Wilson, Collierville, TN (US); Scott R. Bombaugh, Burke, VA (US); Carla F. Sherry, Annandale, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/221,578

(22) Filed: Apr. 2, 2021

(65) Prior Publication Data
US 2021/0224741 A1    Jul. 22, 2021

Related U.S. Application Data

(63) Continuation of application No. 14/821,618, filed on Aug. 7, 2015, now Pat. No. 10,970,667.

(60) Provisional application No. 62/035,325, filed on Aug. 8, 2014.

(51) Int. Cl.
*G06Q 10/08* (2012.01)
*B07C 3/00* (2006.01)

(52) U.S. Cl.
CPC ......... *G06Q 10/08355* (2013.01); *B07C 3/00* (2013.01)

(58) Field of Classification Search
CPC .................. G06Q 10/08; G06Q 10/08355
See application file for complete search history.

(56) References Cited

U.S. PATENT DOCUMENTS

| 6,279,750 B1 | 8/2001 | Lohmann |
| 7,840,319 B2 * | 11/2010 | Zhong .................... G06Q 10/08 701/25 |
| 10,346,766 B1 * | 7/2019 | Yao ...................... G06Q 10/083 |

(Continued)

FOREIGN PATENT DOCUMENTS

| DE | 196 47 973 C1 | 9/1997 |
| EP | 2 072 152 A2 | 6/2009 |

OTHER PUBLICATIONS

Parragh, Sophie N., Karl F. Doerner, and Richard F. Hartl. "A survey on pickup and delivery problems." Journal fur Betriebswirtschaft 58.2 (2008): 81-117. (Year: 2008).*

(Continued)

*Primary Examiner* — Scott M Tungate
(74) *Attorney, Agent, or Firm* — Knobbe, Martens, Olson & Bear LLP

(57) ABSTRACT

Systems and methods for handling a plurality items by using a sorter to receive items and obtain item information and delivery destinations from the items. A run manifest is generated having an item identifier and a destination for each of the plurality of items. The run manifest data is used in a routing module to generate dynamic routes for delivering the plurality of items, and generating a sequence identifier for each of the plurality of items according to the dynamically generated routes.

20 Claims, 4 Drawing Sheets

(56) References Cited

U.S. PATENT DOCUMENTS

2007/0102329 A1* 5/2007 Rosenbaum .............. B07C 3/14
  209/584
2009/0223877 A1* 9/2009 Karnin ...................... B07C 3/00
  209/552

OTHER PUBLICATIONS

Li, Xiugang, and Luca Quadrifoglio. "Feeder transit services: choosing between fixed and demand responsive policy." Transportation Research Part C: Emerging Technologies 18.5 (2010): 770-780. (Year: 2010).*
International Search Report & Written Opinion dated Oct. 16, 2015 for International Patent Application No. PCT/US2015/044359.

* cited by examiner

SYSTEM AND METHOD FOR DYNAMICALLY ROUTING ITEMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application is a continuation of U.S. application Ser. No. 14/821,618, filed on Aug. 7, 2015, now U.S. Pat. No. 10,970,667, which claims the benefit of priority to U.S. Provisional Application No. 62/035,325, filed Aug. 8, 2014.

BACKGROUND

Field

This disclosure relates to the physical delivery of items using dynamic routes.

Description of the Related Art

The physical delivery of items by a distribution service is affected by the number and characteristics of the items to be delivered. The number of items to deliver to a particular location may change from day to day. Delivery routes and schedules may need to be adjusted to accommodate changing item inventory and in order to maximize efficiency of the delivery route and the workforce. A system for understanding the quantity and type of items to be delivered is important to preparing and planning delivery routes, evaluating staffing and equipment requirements, and for efficient execution of item delivery.

SUMMARY

Some aspects described herein includes a system for handling items comprising an a sorter comprising a scanning device, the sorter configured to receive and scan a plurality of items, and configured to generate a run manifest based on the item information and destination information, the run manifest comprising an item identifier and a destination for each of the plurality of items; an inventory control processor configured to receive and store item information and destination information for each of a plurality of items; a processor configured to select a plurality items for dynamic routing based on a criteria and to generate a run manifest, the run manifest comprising an item identifier and a destination for each of the plurality of items; a routing module configured to receive the run manifest and generate one or more dynamic routes for delivering the plurality of items according to the destination for each of the plurality of items; and a processor configured to associate the item identifier of one or more of the plurality of items with one of the one or more dynamic routes and storing the association in a memory.

In some embodiments, the routing module is further configured to generate a sequence identifier for one or more of the plurality of items and storing the sequence identifier.

In some embodiments, the system further comprises a sorting module configured to receive an item identifier from each of the plurality of items and receive the dynamic route and sequence identifier associated with the item identifier.

In some embodiments, the sorting module is further configured to display a dynamic route identifier and/or the sequence identifiers associated with the item identifiers to one or more of the plurality of items.

In some embodiments, the sorting module is further configured to sort plurality of items according to the dynamic routes and/or the sequence identifiers associated with the plurality of items.

In some embodiments, the inventory module is further configured to associate each of the plurality of items with a static route according to the destination for each of the plurality of items.

In some embodiments, the inventor module is further configured to group one or more static routes.

In some embodiments, the routing module is further configured to generate the one or more dynamic routes according to the grouped static routes.

In some embodiments, the generated dynamic routes include destinations for the items associated with the grouped static routes.

Some aspects described herein include a method of handling items comprising receiving a plurality of items in a sorter, the sorter comprising a scanner; scanning the plurality of items to obtain an item identifier and a destination for each of the plurality of items; generating, by a processor, a run manifest, the run manifest comprising the item identifier and the destination for each of the plurality of items received in the sorter; sending the run manifest to a routing module; generating, by a processor, one or more dynamic routes for delivering the plurality of items according to the destination for each of the plurality of items; and associating the item identifier of one or more of the plurality of items with one of the one or more dynamic routes and storing the association in a memory.

Some aspects described herein include a method of dynamically routing items comprising selecting, by a processor, a plurality items for dynamic routing based on a criteria; generating, by a processor, a run manifest, the run manifest comprising an item identifier and a destination for each of the plurality of items; sending the run manifest to a routing module; generating, by a processor, one or more dynamic routes for delivering the plurality of items according to the destination for each of the plurality of items; and associating the item identifier of one or more of the plurality of items with one of the one or more dynamic routes and storing the association in a memory.

In some embodiments, the method further comprises generating a sequence identifier for one or more of the plurality of items and storing the sequence identifier.

In some embodiments, the method further comprises receiving, by a processor, an item identifier from each of the plurality of items and receiving the dynamic route and sequence identifier associated with the item identifier.

In some embodiments, the method further comprises applying the destination identifiers and/or the sequence identifiers associated with the item identifiers to the physical items.

In some embodiments, the method further comprises sorting the plurality of items according to the dynamic routes and/or the sequence identifiers associated with the items.

In some embodiments, the method further comprises associating each of the plurality of items with a static route according to the destination for each of the plurality of items.

In some embodiments, the method further comprises grouping one or more static routes, and wherein generating one or more dynamic routes comprises generating a dynamic route according to the grouped static routes.

In some embodiments, the generated dynamic routes include destinations for the items associated with the grouped static routes.

In some embodiments, the criteria is selected from the group consisting of: a time, a class of service, an item type, and a delivery date.

DETAILED DESCRIPTION

Figure 1:
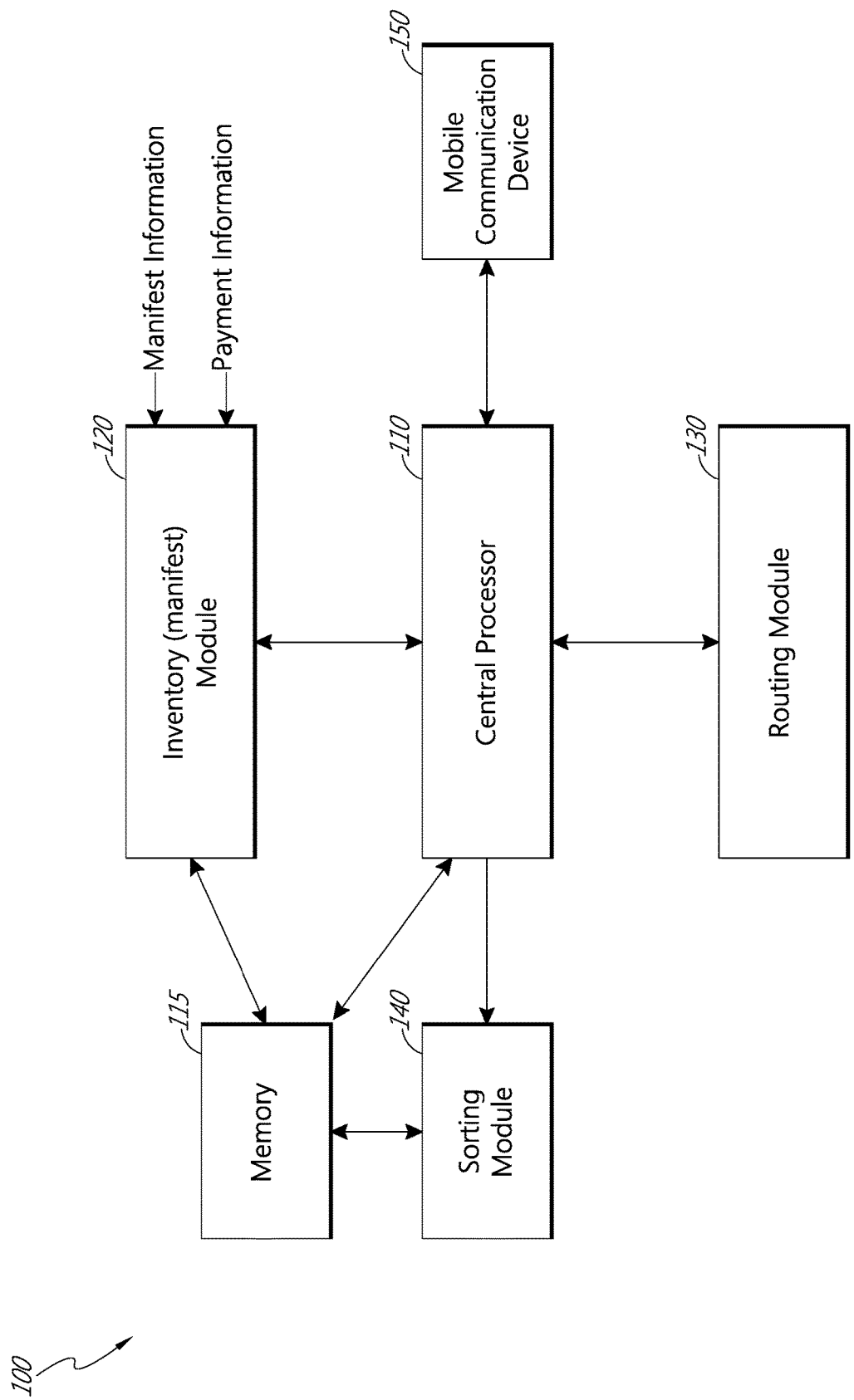
FIG. 1 is a block diagram of a system for providing dynamic routing of items.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The present disclosure relates to systems and methods for providing dynamic routing of items in a distribution network. This may include providing a dynamically created route for each delivery period. This may also include providing a dynamic route modification of one or more static routes by mapping or assigning one or more static routes to a dynamic route. For example, one or more routes may be dynamically created each day, or at any other desired periodicity, using information regarding the type and quantity of items for delivery in a specific geographic area. Also, one or more dynamic routes may be created using a static route framework as a basis. In order to accomplish efficient dynamic routing, a dynamic routing system may require real-time tracking data for each item in the distribution network, as well as for components, such as processing and handling equipment and delivery resources, of the distribution network.

As used herein, the term item may refer to discrete articles in the distribution network, such as mailpieces, letters, flats, magazines, periodicals, packages, parcels, and the like. The term item can also refer to trays, containers, conveyances, crates, boxes, bags, and the like. As used herein, the term carrier may refer to an individual assigned to a route who delivers the items to each destination. The term may also refer to other delivery resources, such as trucks, trains, planes, and other components of the distribution network. The present disclosure also relates to systems and methods to dynamically alter routes during the delivery process based on a change in items for delivery or pick-up in a geographic area. As used herein, the term module may refer to a specific purpose computer, including a dedicated memory and specific programming, a hardware embodied processor, or a specifically programmed or designed application. An exemplary distribution network may be the United States Postal Service. With the large number of items, including letters, flats, parcels, etc., and the large number of addresses to service, managing inventory and developing dynamic routes requires the processing and storage of very large amounts of data. To process the large volumes of data and provide real-time or near real-time information may require supercomputing capabilities. For example, the United States Postal Service delivers more than 528 million mailpieces to over 152 million destinations (addresses) every day. Although the United States Postal Service is discussed herein as an exemplary distribution network, it will be understood that this disclosure is not limited thereto.

A distribution network may comprise multiple levels. For example, a distribution network may comprise regional distribution facilities, hubs, and unit delivery facilities, or any other desired level. For example, a nationwide distribution network may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the United States Postal Service, the unit delivery facility may be associated with a ZIP code. The unit delivery facility receives items from local senders, and from hub level facilities or regional distribution facilities. The unit delivery facility also sorts and stages the items intended for delivery to destinations within the unit delivery facility's coverage area. Each of the levels in the distribution network may act as an intake facility where items are inducted into the delivery stream.

FIG. 1 depicts one embodiment of a system for dynamic routing. A system 100 comprises a central processor 110, a memory 115, an inventory module 120 or inventory control processor, a routing module 130 or routing processor, a sorting module 140 or sorting processor, and a mobile communication device 150. The system 100 may be implemented at any level of the distribution network, such as in a unit delivery facility, a hub level facility, or a regional distribution center. In some embodiments, the system 100 may have multiple components in a unit delivery facility and may have other components which service more than one facility. For example, in some embodiments, the distribution network may comprise one central processor 110, memory 115 and one inventory module 120 in communication with each other which service the entire distribution network. These components may be in communication with multiple sorting modules 140 located in multiple unit delivery facilities, all of which communicate with the one system-wide memory 115 and inventory module 120.

In some embodiments, the system 100 may have more than one of each component, such as inventory module 120 and routing module 130 which are interconnected and which service defined coverage areas. For ease of discussion, the system 100 will be described in greater detail with reference to a unit delivery facility. The central processor 110 can be embodied on a computer or a central server which communicates via wired or wireless link to the other components of the system 100. The central processor can be remote to the unit delivery facility in which the system 100 is used, and may service more than one unit delivery facility. The central processor 110 controls and/or directs the operation of the components of the system 100.

The memory 115 is in communication with the central processor 110, the inventory module 120 and the sorting module 140. The memory can store data and information, such as in a database, a relational database, or in any other information storage format, such as comma delimited, etc. The memory 115 can also store the operating instructions for the components of the system 100.

The inventory control module 120 can be embodied in hardware, such as a dedicated computer, a processor, as software running on the central processor 110, and the like. The inventory control module 120 receives information relating to items intended for delivery within the area corresponding to the distribution facility in which the system 100 is located. In the present example, the inventory control module 120 receives information regarding the items that are inbound to a particular unit delivery facility. The information received can include the destination, such as the mailing address, the size, weight, or other physical characteristic of the item; the service class, such as first class mail, bulk mail, and others; postage and payment status; desired delivery date; predicted time of arrival at the unit delivery facility; shipper and recipient delivery preferences, and any other desired item characteristic. The inventory control module 120 receives information relating to items from a variety of sources. The inventory control module 120 can receive this information from a similar inventory control module at a higher level in the distribution network, from a source on distribution entity's computer network, from manifests, or from other sources. The inventory control module 120 will be described in greater detail below.

The central processor 110 is in communication with routing module 130. The routing module 130 receives item information from the central processor 110 or the inventory control module 120. The routing module 130 receives information regarding personnel, vehicle availability, manpower and/or delivery asset information. In some embodiments, this information is input by a user at a particular location in the distribution network, such as a manpower system or a supervisor. In some embodiments, this information is received from other systems utilized by the distribution network. The routing module 130 can also receive route information such as street conditions, seasonal availability, route closures, parade routes and dates, and a variety of other factors that could affect a routing plan. The routing module 130 applies routing algorithms using the input parameters to generate dynamic routes and sequence identifiers for the items in each dynamic route. The functions of the routing module 130 will be described in greater detail below. Upon generating routing plans, dynamic routes, and/or sequence identifiers, the routing module 130 communicates the routing plans, dynamic routes, and/or sequence identifiers to the inventory module 120. This information may also be stored in the memory 115.

The routing module 130 may assign a sequence identifier to an item based on the delivery sequence of the items assigned to a dynamic route. The sequence numbers can be indicative of the sequence of destinations along a route. For example, the first destination on the route can be assigned a sequence identifier "1", the second destination sequence identifier "2", and so on. If more than one item is intended for a particular destination or recipient, the same sequence identifier can be applied to the items intended for the same destination. Items can then be loaded onto a transportation vehicle or other delivery resource according to sequence identifier or in reverse sequence identifier number. The transportation vehicle may have shelves or compartments configured to receive the items. During the delivery process, a delivery asset, such as a carrier, may retrieve from the transportation vehicle the items for a particular destination. In order to facilitate easy access to the items in the transportation vehicle the items can be loaded into the delivery vehicle in reverse sequence identifier order such that the highest numbered sequence identifier is loaded first, and the lowest numbered sequence identifier is loaded last. In this way, the lowest numbered sequence identifier, which corresponds to the item for delivery to the first delivery destination on a route can be retrieved and delivered first.

In some embodiments, the sequence identifier can correspond to a segment identifier which will be described in greater detail below.

The sorting module 140 is in communication with the memory 115 and the central processor 110. The sorting module 140 receives output, such as sequence identifiers, dynamic routes, and/or route instructions from the routing module 130, either directly or via the central processor 110. The sorting module 140 may be embodied as a computer or terminal having a display, a printer, and other output features, or it may be embodied as software, which is run, for example, on the central processor 110. In some embodiments, the sorting module 140 may be similar to the system and devices described in U.S. Application No. U.S. Ser. No. 13/834,272, entitled "SYSTEMS, METHODS, AND DEVICES FOR ITEM PROCESSING, filed Mar. 15, 2013, the entire contents of which are hereby incorporated by reference. In some embodiments, the sorting module 140 may be a handheld item configured for use by personnel at a unit delivery facility which has scanning and display capability, or can be another piece of mail processing equipment configured to receive and sort items to a plurality of locations.

The sorting module 140 can provide a display, a printout, or other feature which provides or indicates a sequence identifier within a dynamic route created by the routing module 130. The sorting module 140 can direct a delivery person or automated delivery system to apply a sequence identifier to the items associated with a dynamically created route. The sequence identifier may be stored in the memory 115. The sorting module 140 can be in communication with the inventory module 120 either directly or via the central processor 110. In some embodiments, the sorting module 140 is located in a unit delivery facility. Upon receipt of items at the unit delivery facility, the items, or identifiers on the items, can be scanned, imaged, read with the sorting module 140. Upon reeving the scan, image, or read of an item or identifier, the sorting module 140 can communicate with the inventory module 120, the routing module 130, and/or the memory 115 to determine whether the scanned item, or information relating to the scanned item, is contained within the inventory module 120. If the item is in the inventory module 120, or has been assigned a sequence identifier or dynamic route by the routing module 130, the sorting module can display the sequence identifier and dynamic route for the scanned item.

In some embodiments, the sorting module is configured to print, attach, affix, or otherwise label the items with a dynamic route or sequence identifier by using a printer or other similar device. If an item is not in the inventory, which may be the case if the item was received directly in the unit delivery facility, or if the item was not identified at a higher level in the distribution network, the sorting module 140 can scan the item or direct mail processing equipment to scan the item, and is configured to add the item to inventory by communicating with the inventory module 120, or the memory 115. In some embodiments, if the item is not in inventory, the sorting module 140 may set the item aside, or provide instructions to set the item aside. Operation of the sorting module 140 will be described in greater detail below.

The mobile communication device 150 can be a mobile computing device with wireless communication capability, such as a smartphone, tablet computer, personal digital assistant, or other similar device. The mobile communication device 150 can receive from the routing module 130 or the central processor 110 a dynamic route, including turn-by-turn directions and item sequence identifiers, generated by the routing module 130. This information can be wirelessly transmitted to the mobile communication device 150, or it can be added or synchronized over a wired or other network connection while the mobile communication device 150 is at the unit delivery facility. A delivery asset, such as a delivery person or carrier, can load the items associated with the dynamic route onto a delivery vehicle, and carry the mobile communication device 150 on the dynamically created route. In this way, the delivery asset can follow the turn-by-turn directions and deliver the items according to the sequence identifiers. In some embodiments, the mobile communication device 150 has mapping and GPS capabilities to support delivery along the dynamic routes. The mobile communication device may be similar to those described in U.S. application Ser. No. 14/108,680, filed Dec. 17, 2013, entitled "SYSTEM AND METHOD OF COORDINATING DISTRIBUTION OF AN ITEM," the entire contents of which are herein incorporated by reference.

Figure 2:
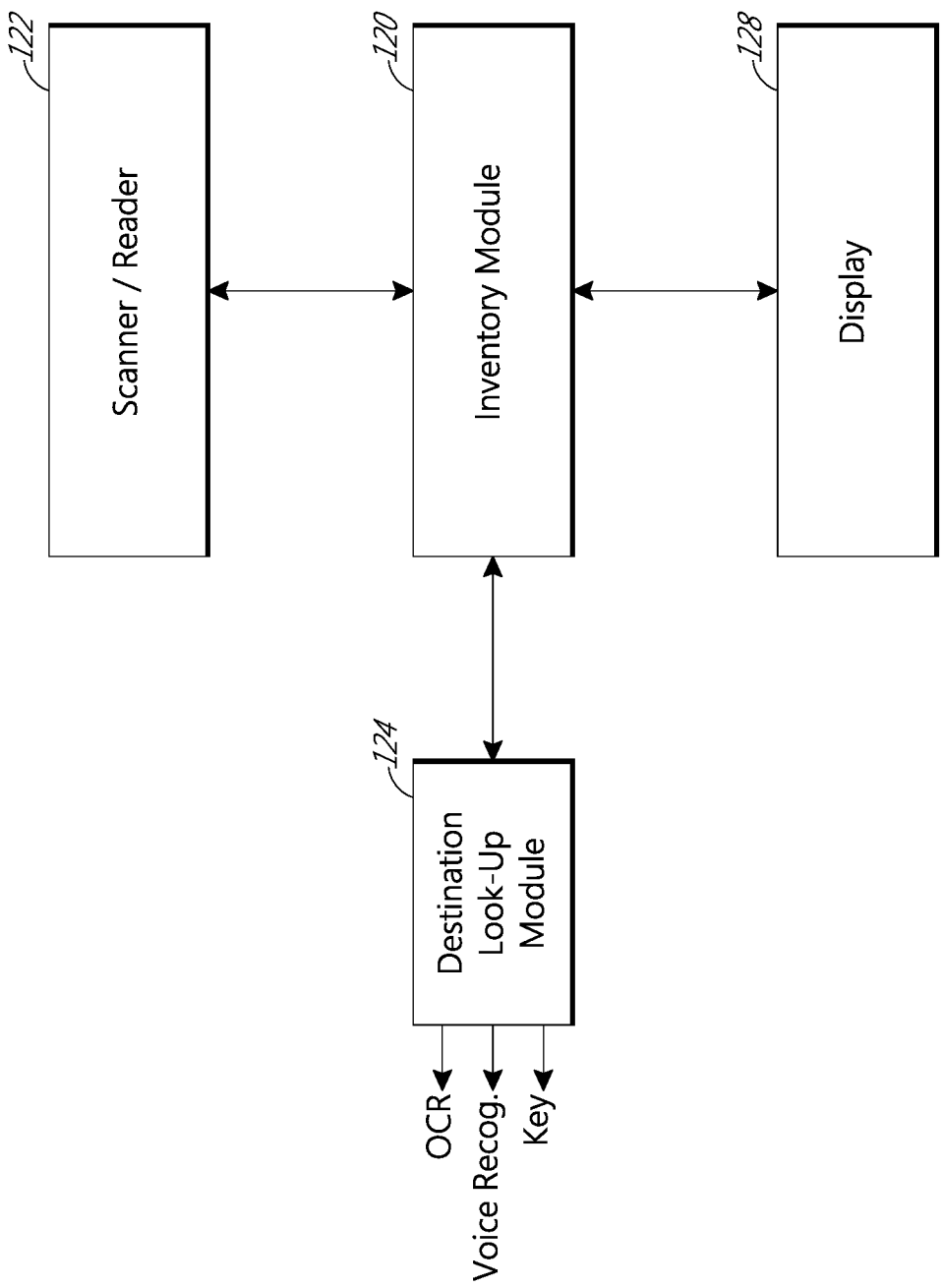
FIG. 2 is a block diagram depicting connections to the inventory module of FIG. 1.

FIG. 2 shows a block diagram of further connections to the inventory control module 120 of FIG. 1. The inventory module 120 is connected to or in communication with a scanner/reader 122, a destination look-up module 124, and an alternate look-up module 126. The inventory control system also includes a display 128. In some embodiments, the scanner/reader 122 is part of the sorting module 140.

The inventory module 120 can be a centralized processor which receives communication and input from multiple scanner/readers 122. In some embodiments, scanner/readers 122 may be located at each level of a distribution network, for example, when they are integrated with the sorting module 140. The scanner/readers 122 may be of various types and configurations which are able to scan a computer readable code, capture an image, and/or perform optical character recognition (OCR) of an identifier, address, or any information on an item. The scanner/readers 122 at each level are in communication with the inventory module 120, either via a wired network, a wireless network, the internet, a cellular network, or any other desired communication network.

To illustrate, a scanner/reader 122 is located at an intake processing facility of the distribution network. Upon receiving an item in the intake processing facility, the item is scanned and/or read using scanner/reader 122. In a case where the item has a computer readable code, such as a barcode, QR code, or the like, the scanner/reader 122 scans or reads the computer readable code, processes the computer readable code, and transmits the code, or information associated with the computer readable code, to the inventory module 120. In some embodiments, the scanner/reader 122 can receive an image of an item or a label and perform optical character recognition on the received image. The inventory module 120 is configured to query the memory 115, or other similar storage apparatus whether the computer readable code is in the memory 115, as may be the case where an item is manifested with the distribution network prior to the item arriving in the distribution network. The inventory module 120 may also query the memory 115, or its own storage memory, as to whether any item information, such as size, weight, service class, destination, recipient, sender, shipper, delivery requirements, delivery preferences, and the like are is associated with the computer readable code. This item information may be received via a manifest or an electronic manifest provided to the distribution network by the sender, mailer, or shipper of the item. If the computer readable code and the item information are present in the memory 115 the inventory module is configured to note, store, save, and/or communicate with the central unit 110, the memory 115, and any other desired component that the item has been received in the distribution network.

The inventory module 120 is also configured to communicate to the unit delivery facility located near the item's destination or which services the area in which the item's destination is located. The inventory module 120 may send the computer readable code, information related to the computer readable code, and/or the item information to be stored locally at the unit delivery facility. In some embodiments, the inventory module 120 is configured to generate a manifest, listing, file, or other similar record in memory which is accessible by the sorting module 140, or other component, processor, or system at the unit delivery facility. In this way, a unit delivery facility can access information regarding each item which is to be shipped, sent, or transported to the unit delivery facility. The item information for such items can be generated, sent, viewed, or otherwise made accessible on a predetermined time schedule, such as hourly, daily, weekly, or any other time period.

In a case where the item does not have a computer readable code, such as a barcode, QR code, or the like, or if the item has a computer readable code which is not recognized by the scanner/reader 122 or is not present in the memory 115, the inventory module 120 may direct the scanner/reader 122 to capture an image of the item. The image of the item may include sender fields, such as a return address, and recipient fields, such as a recipient, destination, and the like. The scanner/reader 122 and the sorting module 140, or the inventory module 120, may analyze, process, or interpret the image using OCR or other similar methods. If the scanner/reader 122 and/or the inventory module 120 are able to obtain recipient or destination information from a computer readable code on the item or from the captured image of the item, the inventory module 120 is configured to generate a record in the memory 115 for the item and any item information that can be obtained from the image of the item. In some embodiments, the inventory module 120 may direct the sorting module 140, equipped with a printer or output module (not shown), to generate a computer readable code for the item, which can be affixed to, attached to, or printed on the item.

In some situations, the image of the item may not be properly interpreted by optical character recognition or the like, due to, for example, bad handwriting, missing information, or damage to the item. If the image of the item does not yield delivery or recipient information, for example, if the address does not have a ZIP code or the ZIP code is illegible, the inventory module 120 may transmit the image to the destination lookup module 124. The destination lookup module 124 can be embodied as software running on a processor of the inventory module 120, on the central processor 110, or as a standalone computer comprising a processor and memory configured to perform the functions of the destination lookup module. In some embodiments, the destination lookup module 124 may be located in a centralized lookup facility remote to the inventory module 120 or the central processor 110, or may be co-located with the inventory module 120 or the central processor 110.

The destination lookup module 124 is configured to determine or interpret recipient and/or destination information from items which cannot be interpreted by the scanner/reader 122. In some embodiments, the destination lookup module 124 comprises an input (not shown) such as a keyboard, microphone, imager, and the like, configured to receive input to interpret and determine the destination and/or recipient for an item. For example, where an item has a label which is unreadable by the scanner/reader 122, due to, e.g., bad handwriting, damaged label, missing label, obscured label, etc., the inventory module 120 or central processor 110 transmits the image of the item obtained by the scanner/reader 122 to the destination lookup module 124. The destination lookup module 124 uses several techniques to interpret the destination and/or recipient from the image of the item. In some embodiments, a user views the image of the item and, using a voice recognition input device, reads the destination, such as the address, from the image, and the destination lookup module 124 interprets the destination from the voice recognition input device. In some embodiments, the destination lookup module uses a predictive keying or an assisted keying algorithm where a user inputs a first character or a first few characters into the destination lookup module 124 using the input, and the predictive keying algorithm predicts the address based on the first few characters of the destination. In some embodiments, a user inputs the entire destination and/or recipient into the destination lookup module 124.

The input destination and/or recipient are associated with the item from which the unreadable image was obtained. This may occur in the destination lookup module 124 or the inventory module 120. The association is stored in the memory 115. By storing the association, the distribution network knows the intended destination for the item having the unreadable destination, and can process the item accordingly. In some embodiments, the input address is associated with a computer readable code already on the item. In some embodiments, the input destination is associated with a computer readable code which is placed, affixed, printed, or otherwise attached to the item.

The system 100 may be utilized in a variety of situations. In one aspect of the present disclosure, the system 100 may be used in a static-dynamic routing operation. To illustrate, a static dynamic routing operation may be a routing of different classes or types of items using different routing scenarios for each. A first type of item may be regularly distributed or delivered on a routine schedule according to fixed or static routes. A second type of item may be delivered on a different schedule or as items of the second type become available for delivery. In a situation where the number of items of the first type, or where the number of destinations of items of the first type exceeds the number or destinations of items of the second type, it may be advantageous to deliver the first type of item according to static routes, and deliver the second type of items using dynamic routes. For example, the United States Postal Service may deliver items of mail, such as letters, flats, etc., according to static routes, and may deliver parcels, packages, and bulky items according to dynamic routes. The United States Postal Service (USPS) will be used to describe exemplary embodiments, but the present disclosure is not limited thereto.

The USPS delivers mail to every address in the United States on a daily basis, Monday through Saturday. To accomplish this feat, the USPS uses static routes which carriers follow every day, which cover every address in the country. At times it may be advantageous for the USPS to cease delivery of all types of mail to every address on a particular day of the week, for example, on Saturdays. It may also be advantageous to deliver only a particular class, or classes, of mailpieces (such as packages or parcels) on a particular day of the week, for example, Saturdays. By limiting the delivery schedule, the amount of resources expended on the limited delivery day can be reduced and/or used more efficiently.

When the unit delivery facility plans only to deliver a certain type of items, for example, parcels or packages, on a certain day, the distribution of delivery destinations for parcels or packages may not be even between the static routes. Some static routes may have no destination addresses for the packages or parcels, and others may have many parcels or packages for delivery. Thus, it may be inefficient to have the parcels or packages delivered according to the static routes. The static route environment, however, provides advantages as carriers develop a tremendous amount of local knowledge regarding local situations and circumstances along the static routes. Because carriers travel the same routes every day, they develop expertise and familiarity with the routes, and this local knowledge can increase efficiency. Generating entirely dynamic package or parcel routes could reduce the efficiency gains realized by the store of local knowledge held by the carriers.

In order to leverage the gains in efficiency by reducing work force and keep the efficiencies gained by local knowledge, the distribution network may use the static-dynamic routing system.

The static carrier routes are stored in the memory 115. The destinations and addresses of each carrier route are also stored. When an item is received and the destination is determined, either by scanning a computer readable code, OCR, or via the dynamic lookup module, the central processor 110 or the inventory module 120 can match the destination with the static carrier route which delivers to the item's intended destination, which can be stored in the memory 115. Thus, the inventory module 120 can track and predict the number and type of packages destined for each static route. This information can be calculated or provided continuously, or periodically, such as once a week, once a day, twice a day, once an hour, or any other desired periodicity.

When an item in the distribution network is scanned by the scanner/reader 122, the scan transaction is stored in the memory 115 either via the inventory module 120 and/or under the direction of the central processor 110. As an item moves through the distribution network, the scanning process is repeated for each piece of equipment the item is processed on, or for each handling event of the item. Each of these handling events or transactions for each item on the processing equipment of the distribution network is logged and stored. With this logged and stored information, the inventory module 120 can associate the static route associated with the each item's destination. Thus, the unit delivery facility can, at any time, request information from the inventory module 120 regarding the items which are assigned to each static route associated with the unit delivery facility.

For example, the unit delivery facility can begin its run to sort item for the day at a certain time of the day, such as early in the morning. The inventory module 120 provides information regarding which packages or parcels are present at the unit delivery facility as of a cut-off time, which can be a certain predetermined time of day. If an item is not present at the unit delivery facility by the cut-off time, the item will not be included in that day's run. When the run begins, the inventory module 120 sends, provides, communicates, or transmits the destination information about all items associated with the unit delivery facility which are at the unit delivery facility for delivery to the routing module 130. The routing module 130 can also receive the static routes associated with the unit delivery facility, a mapping of static routes to dynamic routes, and any particular instructions provided by users of the system 100 via an input module (not shown).

The routing module 130 uses the static routes and generates dynamic routes within groupings of the static routes. Grouping static routes together to produce dynamic routes takes advantage of the organizational knowledge of the local route conditions. For example, a local post office of the USPS may have 10 static routes that cover a geographic area. The static routes may be grouped into 2, 3, 4, 5, or more groups. Static routes 1 and 2 may be mapped to a first dynamic route, meaning that the generated dynamic route will have destinations only covered by static routes 1 and 2. Additionally, static routes 3-6 may be mapped to second dynamic route, and static routes 7-10 may be mapped to a third dynamic route.

The grouping or mapping can be done based on historical data stored in the memory or compiled by the central processor 110 or inventory module 120, which tracks the historical quantity of items delivered in each static route for particular time periods. The time period may be the historic average of items per route for the same day of the week, averaged from week to week, or for the same day of the year, averaged from year to year, the average for the month, or any other desired grouping.

If, for example, the historical data suggests that static routes 1 and 2 have higher volumes of packages or parcels than any of the 10 static routes at the particular post office, these routes may not be grouped together. Also, if static routes 3 through 6 have the lowest historical package volume, these routes may get grouped together for purposes of preparing dynamic routes. The grouping or mapping of static routes may also take into account historical data regarding daily package volume, weekly volume, seasonal volumes, or other historical information.

In some embodiments, the routes may be grouped according to geographic proximity. If static routes 1, 2, and 3 share geographic boundaries, or are adjacent to one another, these routes may be grouped together for purposes of dynamic routing. If static routes 2 and 3 were located on opposite sides of the geographic area, for example, on opposite sides of city, or if the geographic area covered by static route 2 is much larger than the area covered by static route 3, then these static routes may not be grouped together.

In some embodiments, the route grouping may take both historical data and geographic proximity into account, in order to maximize the efficiency of dynamic routes within the groups of static routes. For example, in a post office where there are 10 routes, the grouping of routes based on geography and historical volume can aim to generate 3 or 4 dynamic routes based on 3-4 groups of static routes that will have the same or similar estimated package volume and estimated completion time as each other.

The groupings of static routes may be determined by the inventory module 120 or under the direction of the central processor 110. The parameters for the groupings can be generated automatically or can be input by a user into the inventory module 120. The groupings of static routes are provided to the routing module 130.

The routing module 130 uses the destinations for all the items, such as packages, to be delivered from the unit delivery facility. The routing module 130 determines which items have destinations within each group of static routes, and prepares an optimized dynamic route for each grouping of static routes. The routing module 130 takes into account various variables and conditions, as described above, and generates an optimized route or dynamic route for delivery of each of the items assigned to a group or mapping of static routes. The routing module 130 may receive parameters and instructions from the unit delivery facility, such as from a unit delivery facility manager or other computer system (not shown). For example, a unit delivery facility may only have a fixed number of carriers, trucks, facility personnel, or other resources available on a specific day. In such an instance, this information can be provided to the routing module 130 to define how many dynamic routes should be created. In some embodiments, a unit delivery facility may desire dynamic routes be created which have varying completion times. If two carriers are available for a full day of work, and two are available for only a half-day each, the unit delivery facility can provide input to the routing module 130 to generate two 8-hour dynamic routes and two 4-hour dynamic routes to coincide with the number of available personnel. The unit delivery facility may provide any other desired constraints to the routing module 130 in order to most efficiently facilitate delivery of the items.

The routing module 130 generates a sequence identifier for each item based on the dynamic route. The sequence identifier may indicates the delivery order of the item. That is, where 20 packages are assigned to a dynamic route, the first item to be delivered is given the sequence identifier 1, the second item receives sequence identifier 2, and so on, for each item in the dynamic route. The routing module 130 transmits the dynamic routes, dynamic route numbers, and sequence identifiers, to the central processor 110. In some embodiments, the routing module 130 also prepares turn-by-turn directions, instructions, alerts, and messages to be displayed on the mobile communication device 150, which may have an electronic mapping ability, or may be a GPS enabled smartphone or other similar mobile computing device. The central processor 110 associates the computer readable codes for each item on each route with the dynamic route number and the sequence identifier, and stores this information in the memory 115.

As the run continues, the dynamically routed items for delivery are run through the sorting module 140. In some embodiments, the sorting module may identify the items based on a scan of the computer readable code on the item, or based on an OCR of the address. When the item is passed through the sorting module 140, the sorting module 140 queries the memory 115 to obtain the dynamic route and sequence identifier which has been assigned to and associated with the item. This may be done by using the computer readable code to lookup the associated dynamic route number and sequence identifier in the memory 115. In some embodiments, an item may be present at the unit delivery facility which was not in the inventory module 120. Thus, upon scanning the items for delivery with the sorting module 140, no dynamic route or sequence identifier is assigned to the item. In some embodiments, this item may be set aside for delivery on a subsequent day, or may be added to the item inventory and the item information re-sent to the routing module 130 to incorporate into the existing dynamic routes or new dynamic routes can be calculated.

Upon receiving the dynamic route number and the sequence identifier, the sorting module may display the dynamic route number and the sequence identifier on a display. In some embodiments, a user of the sorting module 140 can write the sequence identifier on the item. In some embodiments, the sorting module may automatically print or attach the sequence identifier to the item. The sorting module may display the dynamic route number so that a user can place the item in a staging area for the particular dynamic route. In some embodiments, the sorting module is configured to automatically sort and transport the item to the proper staging area for the particular dynamic route.

When the carrier arrives at the staging route, the carrier can load the items into a carrier vehicle in reverse item sequence identifier to enable efficient delivery of all the items. In some embodiments, as will be described below, the carrier can load a rack or collection of bins onto the carrier vehicle.

The central processor 110 also transmits the dynamic route, which may include turn-by-turn instructions to the mobile communication device 150, to assist the carrier in following the dynamically created route.

In some embodiments, the number of items in each dynamic route may not be the same or even close to the same. Where there is large discrepancy between the volume of items assigned to each of the dynamic routes created based on the static route grouping, the routing module 130 may automatically, or at the request of a supervisor, regroup or remap the static routes to the dynamic routes, and then recalculate using a different grouping of static routes. In some embodiments, the parameters for grouping static routes may be altered by user input to the routing module 130.

In some embodiments, items are processed on or passed through the sorting module 140 prior to generating dynamic routes. The run or manifest of items for delivery is generated from the scan information of each item provided by the sorting module 140. In some embodiments, the run or manifest of items can include items scanned in the sorting module 140 and items listed on an electronic manifest.

In such embodiments, the dynamic routes are generated for items which are physically located at the unit delivery facility, and which were scanned on sorting module 140, rather than from electronic manifests from the inventory module. In these situations, the information regarding the items expected to be at the unit delivery facility may be relied on to estimate or predict the amount of delivery equipment needed, time needed to complete the deliveries, and number of carriers, facility workers, or other parameters. Using the items at the unit delivery facility to generate the item inventory can account for items which were recently received into the unit delivery facility or were not in known to the inventory module 120 or were not provided on a manifest. As the run begins, all the items in the unit delivery facility, or the group of items for delivery on a specific day, may be passed through the sorting module 140. The sorting module reads the computer readable code or takes an image of the destination as described elsewhere herein. By passing the items through the sorting module 140, the manifest of items for delivery on a particular day or at a certain time is created and stored within memory 115, such as in a temporary file. When the items for delivery have been passed through or scanned by the sorting module 140, the list of items and their associated destinations can be communicated to the inventory module 120. Once all the items or the group of items to be delivered have been processed and/or scanned in the sorting module 140, the inventory module 120 has a list of all the items and their associated destinations for delivery. The inventory module 120 can send this list to the routing module 130. Upon receiving the list of items and associated destinations from the inventory module, the routing module 130 can develop optimized dynamic routes, and assign each item a dynamic route number and a sequence identifier as described elsewhere herein.

In such embodiments, during processing of the items in the sorting module 140, sequence identifiers and dynamic route numbers may not be known. As a result, the items are not sorted according to the dynamic route number and/or sequence identifier. The sorting module 140 can identify the static route normally associated with the destination for which the item is intended. The sorting module 140 can automatically sort the item to the appropriate staging area for the static route. In some embodiments, the sorting module 140 displays the static route number associated with the item's destination, and a user can place the item in the appropriate static route staging area.

In some embodiments, the item can be processed on the sorting module 140 a first time to obtain the destination for each item to send to the routing module 130, and then processed a second time on the sorting module 140 after the dynamic routes and sequence identifiers can be assigned.

The routing module 130 provides the sequence identifiers and the dynamic routes as described above. A carrier then retrieves the items staged in the static routes which make up the static route group corresponding to a dynamic route number, and can apply or affix the generated sequence identifiers to the items, and prepare for item delivery.

Figure 3:
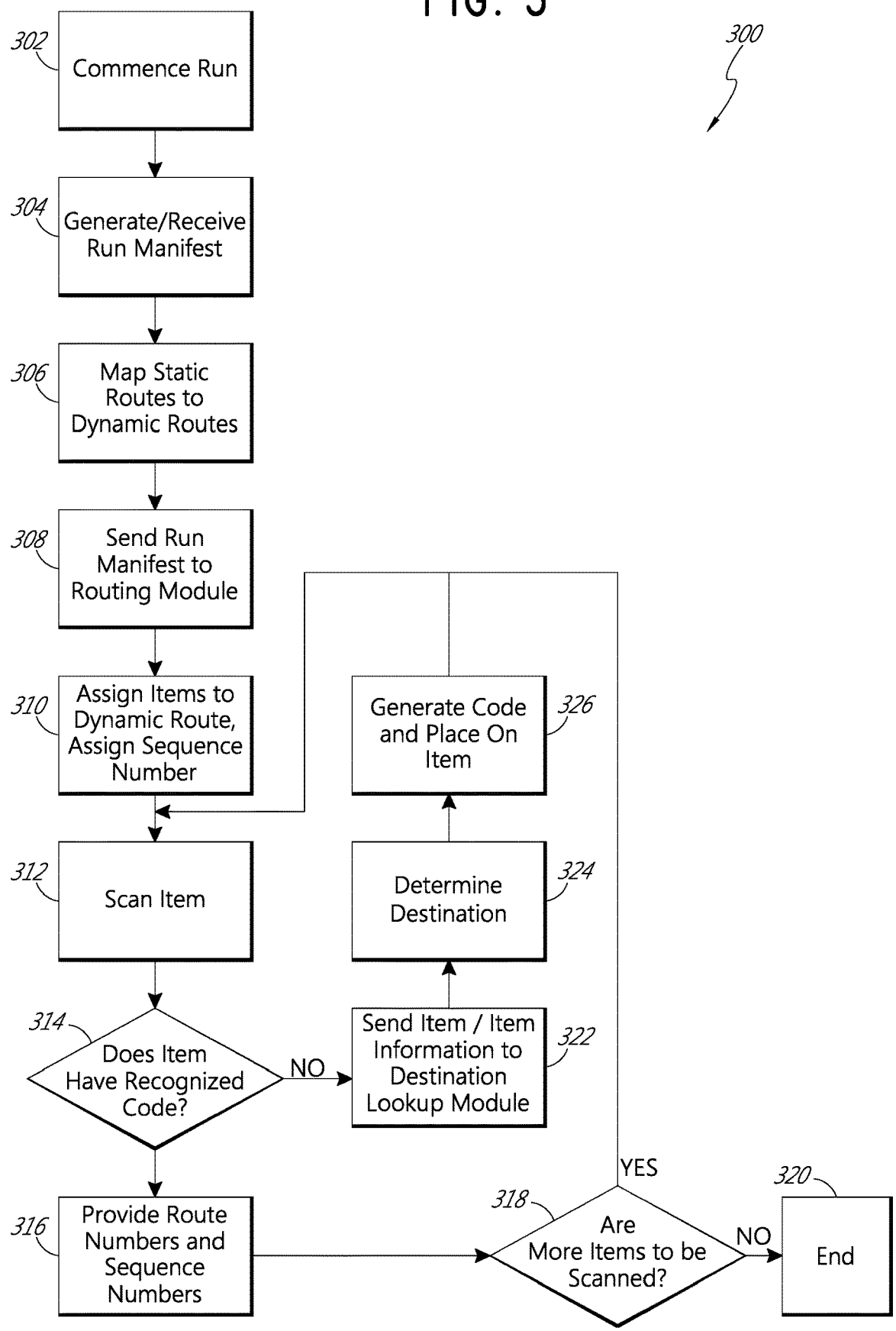
FIG. 3 is flowchart depicting a process using static-dynamic routes.

FIG. 3A depicts a process for preparing static-dynamic routes. Process 300 is an exemplary description of a process that occurs at a unit delivery facility in San Diego, Calif. Processes similarly to process 300 may be run simultaneously, overlappingly, or sequentially at multiple facilities across a distribution network. Process 300 begins in step 302, wherein the system 100 commences a run. The run may be the beginning of processing a batch or group of items. The run may also refer to the batch or group of items itself. The run may be scheduled to occur at a set time, or may occur upon request from an operator or other input. When the run commences, the processor 110 queries the inventory module 120 to determine the identity of items which are at the unit delivery facility to be delivered to the area serviced by the unit delivery facility in order to generate a run manifest.

As described elsewhere herein, the inventory module 120 receives and stores item information for multiple items across the distribution network, and stores the identity of each item associated with the destination information and current location information for each item. For ease of illustration, an exemplary parcel originating in Washington, D.C. intended for delivery in San Diego, Calif. is described, but process 300 is not limited thereto. When the parcel is received into the distribution network in Washington, D.C., an item identifier and an intended destination, a predicted delivery date, and other information, is associated with the item and stored by the inventory module 120 in the memory 115. At each processing location or facility in the distribution network through which the parcel passes on its way from Washington, D.C. to San Diego, the parcel is scanned. These scan events and event locations are associated with the item and stored in the inventory module 120. By so doing, the inventory module 120 receives and stores the item information, intended destination information, and current location for the parcel, as well as for every other item in the distribution network.

When the run commences in step 302, the inventory module 120, under the direction of the central processor 110, identifies which items that are intended for delivery from the unit delivery facility in San Diego are currently located at the unit delivery facility in San Diego. If the parcel from Washington, D.C. is at the unit delivery facility in San Diego, the item information and the destination (e.g., street address) for the parcel are added to the run manifest. The run manifest includes all the items that are at the unit delivery facility and intended for delivery from that unit delivery facility as of the time the run commences.

Upon commencing the run in step 302, the run manifest is created in step 304. The run manifest is a compilation of item information, destination information, any associated identifiers, such as bar codes, OCR'd images, and the like for each item to be delivered. In some embodiments, the run manifest includes delivery instructions or requirements, such as time of day delivery requirements or special handling instructions, e.g., if an item is perishable, requires climate control, and the like. For example, an item on a run manifest may have a bar code associated with the item, such as a UPC, which UPC can be looked up in the memory 115, to identify the item as a particular product. The memory 115 can store special instructions that apply to the particular product to be delivered based on the UPC. If the UPC identifies an item as perishable, the run manifest can include instructions to deliver in a climate controlled vehicle to a climate controlled receptacle, or can include instructions to deliver the item within a prescribed time period. The prescribed time period can include a requirement to sequence the route such that the perishable items are delivered before noon, within the first hour of the departure of the delivery resource, or be sequenced to be delivered first.

Process 300 next moves to step 306, wherein static routes are grouped or mapped to dynamic routes. As described above, each particular destination for an item is associated with a static route. This mapping or grouping may occur as described elsewhere herein. In some embodiments, the mapping of static routes to dynamic routes may be fixed for a unit delivery facility, or may be variable based on the destinations for items on the run manifest. For example, if, after the run manifest is generated, it is determined that a disproportionate number of items correspond to one or more static routes as compared with other static routes, the mapping of the static routes to dynamic routes may be adjusted, as needed. This adjustment can occur via operator input, or can occur automatically, also as described elsewhere herein.

In some embodiments, step 306 can be performed prior to generating or receiving a run manifest. The mapping or grouping may occur prior receiving a run manifest, and may correspond to manifested items which are at the delivery facility or are known or expected to be en route to the facility. The mapping or grouping of static routes can take into account manifested items which are not yet physically present at the delivery facility, but are expected to be at the delivery facility before the run commences, or before delivery of the items to their destinations is intended to occur. For example, a distribution network or delivery facility can receive information from a shipper or other entity regarding a quantity of items scheduled for delivery to destinations within the static routes associated with the delivery facility (in other words, intended for delivery within the static territory). The shipper or other entity may provide a manifest, such as an electronic manifest, regarding items for delivery within the static territory. The shipper may be a retailer, other distribution network, or similar entity. Where the shipper's manifest indicates a large number of items are intended for delivery to destinations associated with one or a small number of static routes, the mapping of static routes to dynamic routes can be adjusted to take into account the manifested items.

In some embodiments, a unit delivery facility can receive intelligence or item information regarding items that are en route, or will be en route from other facilities within the distribution network, and map or group static routes based on expected incoming items in addition to items that are physically present at the unit delivery facility. In some embodiments, the mapping of static routes to dynamic routes can be predetermined based on day of the week, month, season, and the like. For example, if historical data indicates that static routes 1 and 3 receive more items, such as parcels and packages on Mondays, and routes 2 and 4 receive more items on Tuesdays, the predetermined static routes may have routes 1 and 2 grouped on Mondays, and 1 and 3 on Tuesdays, and so on. The predetermined mapping or grouping may be set as the default groupings, but these can be changed by the routing module 130 as the item volume requires. The process 300 next moves to step 308, wherein the run manifest, or in some embodiments, a portion of the information in the run manifest, is provided to the routing module 130. In some embodiments, the mapping of static routes to dynamic routes is also provided to the routing module 130.

In some embodiments, additional information can be sent to the routing module in addition to the run manifest. For example, an item listed on the run manifest may be associated with a particular shipper or recipient. The memory 115 can access information associated with the particular shipper or recipient, such as shipper or recipient preferences. The recipient preferences may include a preferred delivery destination, first attempt delivery instructions, time of day preferences, and the like.

Process 300 next moves to step 310, wherein the routing module assigns the items on the run manifest to a dynamic route, and assigns a sequence identifier to each item assigned to each dynamic route. The route assignments and sequence identifiers are provided to the central processor 110 and to the inventory module 120, where they are stored.

In some embodiments, a recipient or shipper may select a premium service which gives routing priority to items originated from the shipper or intended for delivery to the recipient. The recipient or shipper may pay a fee for the premium service. The selection of the premium service can be noted in the run manifest, or can be received in the routing module 130 along with the run manifest. The routing module 130 can identify the items which are associated with the premium service and will give the items with the premium service with higher priority during sequencing. During the assignment of sequence identifiers, the items with the premium service can be given sequence identifiers that will ensure the premium service items will be delivered first, or before items without the premium service. In some embodiments, the routing module 130 can give higher priority to the premium service items while still preparing an efficient route sequence incorporating the premium service items and the standard items.

Upon assigning route and sequence identifiers, the process 300 moves to step 312, wherein the items are scanned in advance of sorting. The items to be delivered from the unit delivery facility, which are physically at the unit delivery facility, are scanned and/or read using the scanner/reader 122, which is in communication with the sorting module 140. In some embodiments, the scanner/reader 122 is part of the sorting module 140. When the computer readable codes on the items are scanned and/or read, the scanner/reader 122 queries the inventory module 120 for the dynamic route number and the sequence identifier associated with the item. The inventory module 120 provides the requested route and sequence identifiers to the scanner/reader 122. The assigned dynamic route number and sequence identifier may be displayed on display 128, where an operator can affix the dynamic route number and/or the sequence identifier to the item. In some embodiments, the scanner/reader 122 may comprise a printer or label maker which affixes the dynamic route number and/or the sequence identifier to the item.

After scanning the items, the process 300 moves to decision state 314 decision state wherein it is determined whether the item has a recognized computer readable code.

If the item has a recognized computer readable code, process 300 continues to step 316, wherein the dynamic route number and/or sequence identifier are provided to the memory 115 or the sorting module 140, or both. In some embodiments, the sorting module 140 instructs a sorting apparatus to sort items as they are received from the scanner/reader 122, and sorted according to dynamic route and/or static route number. In some embodiments, sorting of the item may be done manually, such as by an operator. The sorting module 140 can update the inventory module 122 and/or the memory 115 to indicate that sorting of the item has been complete, and that the item is out for delivery. In some embodiments, the sorting module 140 generates a label, such as by a printer or other similar device, which is attached to, affixed on, printed on or otherwise placed on the item and includes the sequence identifier for the item. In some embodiments the sorting module 140 directs mail processing equipment to print, affix, or otherwise place the sequence identifier on the item.

The sorting module 140 can direct the items to be directed to particular bins, areas, or locations within the distribution facility and/or the item processing equipment according to the route and sequence identifier assigned to the item. The sorting module can direct sorting of items to predetermined locations for staging items in preparation for loading onto a transportation vehicle. In some embodiments, the staging location for loading the items onto the transportation vehicle includes a sorting rack or other apparatus having a plurality of bins therein. In some embodiments, the rack is portable and can be rolled or loaded onto the transportation vehicle without removing the items from the bins in the rack.

In some embodiments, the sorting rack may be a rollable rack having 5, 10, 15, 20, or more discrete, separated bins for receiving items.

Where a delivery facility has a rack with a plurality of bins, the central processor 110 or sorting module 140 can group sequence identifiers together and assign the grouping of sequence identifiers to one of the plurality of bins in a sorting rack. For example, a specific generated dynamic route includes 100 items, each of which has been assigned a sequence identifier. The sorting module 140 may assign a subset of the sequence identifiers of the 100 items to one of the plurality of bins in the sorting rack. In some embodiments, where sequence identifiers are numerals and where the sorting rack includes 10 bins, the sorting module 140 may assign sequence identifiers 1-10 to bin number 1, sequence identifiers 11-20 to bin number 2, and so on. In some embodiments, the sorting module 140 may assign sequence identifiers 1, 11, 21, 31, 41, 51, 61, 71, 81, and 91 to bin number 1; sequence identifiers 2, 12, 22, 32, 42, 52, 62, 72, 82, 92 to bin number 2, and so on. The sequence identifier and assigned bin are stored in the memory 115.

In some embodiments, items in a group of sequence identifiers assigned to a bin may not have a sequence identifier attached, affixed, or labelled on the physical item. In some embodiments, the sorting module 140 may generate or cause to be generated a label or printing indicating the bin number or bin identifier with which the sequence identifier for an item is associated.

Once all the items for a dynamic route have been sorted according to the sorting module 140's directions, the sorting rack can be rolled, wheeled, loaded, or otherwise put on the transportation vehicle.

Process 300 next moves to decision state 318, where it is determined whether there are additional items on the run manifest that have not yet been scanned, read, and/or sorted. If the run manifest has items which have not yet been scanned, or if additional items remain at the unit delivery facility which have not yet been scanned, read, or sorted, process 300 returns to block 312, where the next item is scanned. If no items remain on the run manifest to be scanned, read, and sorted, process 300 ends in block 320.

In decision state 314 it is determined whether the item has a recognizable computer readable code. Some items received into the scanner/reader 122 may lack a computer readable identifier or code, some may have a code which is unrecognized by the scanner/reader 122, and some many have a readable code for which no corresponding entry exists in the inventory module 120. In these cases, the items may not be recognized by the inventory module, and consequently may not have a dynamic route number or sequence identifier assigned. When it is determined in decision state 314 that the item lacks a recognizable computer readable code, the process 300 moves to step 322, wherein the item information is sent to the destination look-up module 124. In some embodiments, an image of the item is sent to a facility wherein operators or more advanced imaging equipment interprets the image and determines the intended destination, as described elsewhere herein. In some embodiments, the item is physically moved to a location where an operator can determine the address.

The process 300 next moves to step 324, wherein the destination location is determined using OCR, voice recognition, predictive keying, or other processes, as described elsewhere herein.

Once the destination look-up module 124 has determined the destination location in step 324, the process 300 moves to step 326, wherein a computer readable code is generated for the item, and the code is associated with the item information and the destination information generated by the destination look-up module 124, and stored in the memory 115. If the item lacked a recognized computer readable code, in step 326 a code can printed onto or otherwise affixed to the item. Where the destination look-up module 124 is located remote from the unit delivery facility, the destination look-up module 124 may communicate the computer readable code and the associated information to the inventory module 120 and to the scanner/reader 122. The inventory module 120 or the sorting module 140 may generate a physical representation of the received computer readable code, such as a barcode label, and affix the computer readable code to the item. If the item had a computer readable code, but the computer readable code was not associated in the memory 115 or inventory module 120 with the item and the destination, then the destination look-up module 124 can update the inventory module and/or the memory 115 with the destination information.

Items whose destinations are determined using the destination look-up module 124 may not have been assigned a route number or a sequence identifier in step 310 of process 300. In this case, the item destination may be sent to the routing module 130, which may re-perform the dynamic routing, and reassign new sequence identifiers. In some embodiments, the routing module 130 can determine the best place to insert the new item into the existing dynamic route and sequence. The routing module 130 can assign a sequence identifier in between two existing sequence identifiers, so that the addition of the new item minimizes the interruption or change to the dynamic route. The new item may receive a sequence identifier 1a, 1.1, 1.5, or any other desired sequence identifier.

Process 300 then returns moves to step 312 of process 300, wherein the item is scanned and/or read, and process 300 continues as described elsewhere herein.

In another aspect of the present disclosure, the system 100 may be used in a dynamic routing operation wherein each route is created dynamically for each delivery period. For example, the USPS may desire to deliver only packages on a particular day of the week, for example, on Sundays. In order to ensure predictability of item inventory, the USPS may agree only to deliver items which meet certain criteria. The criteria may include items from or provided by a particular retailer, business, or company. The criteria may include only items which have been electronically manifested, and therefore are known to the inventory module 120, such that dynamic routes can be generated for the known item inventory. The criteria may include items for which a fee has been provided or a particular class of service has been selected by the shipper or the recipient, or may be any other desired criteria.

In such embodiments, the distribution network may begin its run for a unit delivery facility at a particular time, such as on Sunday morning. The inventory module 120 determines which items intended for delivery from the unit delivery facility meet the criteria for delivery on the specific day. The inventory module 120 provides the destinations associated with the items which meet the criteria to the routing module 130. The routing module 130 creates dynamic routes and assigns sequence identifiers. In this embodiment, the dynamic routes are not necessarily associated with static routes or groups of static routes. The dynamic routes are created out of the geographic area associated with the unit delivery facility from which the items are to be delivered.

In some embodiments, rather than deliver items from a unit delivery facility, based on item inventory meeting the criteria, the distribution network may deliver items from a hub, covering the area of one or more unit delivery facilities. For example, for Sunday delivery, if there are fewer packages than a minimum threshold, the USPS may desire to centralize delivery from the hub. In this case, the inventory module 120 provides the destinations for all the items associated with the hub to the routing module 130. The routing module 130 may then generate dynamic routes covering the geographic area of the hub, regardless of the static routes associated with the unit delivery facilities.

In some embodiments, the routing module 130 can be constrained for the dynamic routes by personnel, the inventory module 120, or as built in constraints. For example, the routing module 130 may be instructed not to combine destinations normally assigned to a rural route with destinations normally assigned to a city walking route. In some embodiments, the routing module 130 may be instructed not to generate dynamic routes which cross between two item destinations. In some embodiments, dynamic routes may be categorized loosely according to geography. For example, categories for dynamic routes may be created for destinations closer to the unit delivery facility or hub, and for those farther away. In some embodiments, an extra dynamic route may be created which crosses, intersects, and/or overlaps other dynamic routes, but has smaller item inventory, to act as a buffer route into which newly received items can be incorporated, while maintaining the same number of delivery resources.

Because only packages meeting the criteria are included in the dynamic routes, the processing with the sorting module 140 can be made more efficient. For example, if the criteria for delivery is only to dynamically route only items which have been electronically manifested, the dynamic routes can be generated before processing with the sorting module 140, because all the destinations of the items is known prior to processing on the sorting module 140. Thus, when the items are processed on the sorting module 140, each item will be assigned to a dynamic route and receive a sequence identifier, and each item need be processed on the sorting module 140 once.

After the dynamic routes are created, the items are processed on the sorting module 140. As described above, the sorting module 140 displays which dynamic route is associated with each item, and assigns or displays the sequence identifier for each item, and the items are staged for delivery.

Figure 4:
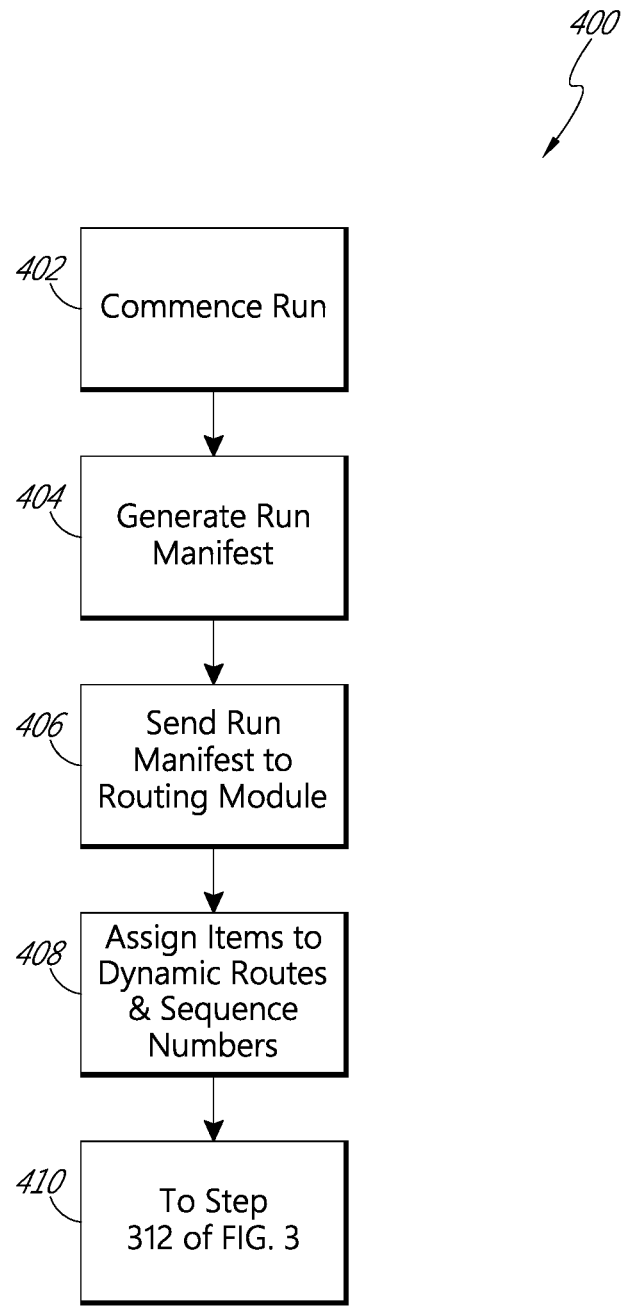
FIG. 4 is a flowchart depicting a process using dynamic routes.

FIG. 4 depicts a process for establishing dynamic routes using only electronically manifested items. Process 400 is similar to process 300, and a detailed description of similar steps has been omitted.

Process 402 begins by commencing a run in step 402. The run commences at a specified time, and in some embodiments, on a specified day, according to the class of service offered or those items meeting the specified criteria.

Process 400 moves to step 404, wherein the run manifest is received and/or generated. The run manifest may comprise items which have previously been electronically manifested and which are physically at the unit delivery facility. The run manifest is then provided to the routing module 130 in step 406. In this case, where the routes are entirely dynamic, they are not mapped to static routes, and no static route information need be provided to the routing module 130. The routing module 130 determines dynamic routes as described elsewhere herein.

The process 400 moves to step 408, wherein dynamic route numbers and sequence identifiers are assigned to the items, as described elsewhere herein. The process then moves to step 410, and proceeds similar to step 312 of process 300. In this embodiment, if an item is scanned or read by the scanner/reader 122 which lacks a recognizable computer readable code, the item is set aside or rerouted, and the item is not incorporated into the dynamic routing scheme.

In some embodiments, a package may be received into the unit delivery facility, as evidenced by a logged event in the memory 115 or inventory module 120. If the item meets the criteria, but the run manifest and dynamic routes have already been calculated, the distribution network may want to update the dynamic routes to facilitate delivery of the new item. When the new item arrives in the unit delivery facility, the inventory module 120 may communicate the new item and its destination to the routing module 130, and request an updated dynamic route. In some embodiments, the routing module 120 evaluates the new item's destination in light of the already created dynamic routes, and identifies a dynamic route to add the new item to while minimizing the disruption to the dynamic route. In some embodiments, the routing module 130 takes the new item's destination and the location of the unit delivery facility, since the carrier will likely need to return to the unit delivery facility to pick-up the item. In some embodiments, the routing module 130 may add the new item to the dynamic route of the buffer route. The routing module provides the new dynamic route and new instructions to the central processor 110, which, in turn, can send updated directions to the mobile communication device 150 of the carrier who will be delivering the new item.

As described above, as the carrier or other delivery resource delivers items along its route, the dynamic route is communicated to the mobile communication device 150. The mobile communication device 150 communicates turn-by-turn instructions to the carrier, and provides visual, audio, and/or tactile prompts to the carrier regarding the sequence identifier of an item to be delivered, and the location of the item in the carrier vehicle. In some embodiments, the mobile communication device 150 provides a visual or audible indication of which bin on the rack of bins the item is located. In this way, the carrier then goes to the bin and selects the item from among the plurality of items in the bin corresponding to the destination where the carrier is currently located, or which is scheduled for the next delivery along the dynamic route. The mobile communication device 150 can retrieve the bin information for the items from the memory 115 via a communications link. In some embodiments, the dynamic route data including bin and sequence identifiers can be downloaded to the mobile communication device 150 at the delivery facility and be stored locally on the mobile communication device 150.

The mobile communication device 150 can include position indication abilities, such as GPS, and the like. As the carrier vehicle approaches the next location on the dynamic route, the mobile communication device 150 can determine that the mobile communication device 150 is nearing the a destination on the dynamic route, and can provide an automatic alert or message to the carrier regarding the location of the item to be delivered in the vehicle. For example, as the carrier nears the next destination on the dynamic route, the mobile communication device 150 determines within a predetermined radius or distance that the carrier vehicle is at the next location, and the mobile communication device displays or audibly identifies the bin number in which the next item to be delivered is located. In some embodiments, the mobile communication device 150 is configured to provide the bin number of the next sequential item automatically following delivery of an item.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present development.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

What is claimed is:

1. A method of dynamically routing items comprising:
generating, by a processor, a run manifest, the run manifest comprising an item identifier and a delivery point for each of a plurality of items;
storing a plurality of static routes in a memory, each of the static routes including a set of fixed delivery points to be followed in a fixed order, the plurality of static routes including all delivery points within a specific geographic location;
grouping the plurality of static routes into a plurality of subsets according to a number of items to be delivered to delivery points along each of the plurality of static routes;
generating, by a processor, a plurality of dynamic routes, each of the plurality of dynamic routes including delivery points from one of the plurality of subsets of static routes;
creating a run manifest based upon the generated plurality of dynamic routes;
assigning items to each of the plurality of dynamic routes; and
sorting, in a sorter, the plurality of items according to the dynamic routes assigned to the plurality of items.

2. The method of claim 1, wherein the delivery point is an address.

3. The method of claim 1, wherein the delivery point is a destination.

4. The method of claim 1, further comprising generating a sequence identifier for each of the plurality of items according to the assigned one of the plurality of dynamic routes.

5. The method of claim 4, further comprising associating the item identifier of one or more of the plurality of items with one of the plurality of dynamic routes and storing the association in a memory.

6. The method of claim 5, wherein the sorter comprises a scanner.

7. The method of claim 6, further comprising scanning the plurality of items to read the item identifiers on the plurality of items, and to identify the dynamic routes to which the plurality of items are assigned.

8. The method of claim 7, wherein sorting the plurality of items further comprises sorting the plurality of items according to the sequence identifier for each of the plurality of items.

9. The method of claim 4, further comprising applying the sequence identifiers to the plurality of items.

10. The method of claim 1, wherein the run manifest comprises an identification of a first type of item and a second type of item, and wherein the method further comprises generating the plurality of dynamic routes for items of the first type, and wherein items of the second type are assigned to the plurality of static routes according to the delivery points for the second type of items.

11. The method of claim 1, further comprising associating each of the plurality of items with one of the plurality of static routes according to the delivery points for each of the plurality of items.

12. The method of claim 1, wherein generating plurality of dynamic routes is based at least in part on a criteria selected from: a class of service, an item type, and a delivery time.

13. A system for dynamically routing items comprising:
a sorter comprising a scanning device, the sorter configured to receive and scan a plurality of items;
an inventory control processor configured to receive and store item information and delivery points from the sorter for the plurality of items;
a memory configured to store a plurality of static routes, each of the static routes including a set of fixed delivery points to be followed in a fixed order, the plurality of static routes including all delivery points within a specific geographic location; and
a routing processor configured to generate one or more dynamic routes within groupings of delivery points within the plurality of static routes, for delivering the plurality of items at delivery points on the one or more dynamic routes for each of the plurality of items;
wherein the sorter is further configured to sort the plurality of items according to the dynamic routes associated with the plurality of items.

14. The system of claim 13, further comprising a processor configured to associate the item identifier of one or more of the plurality of items with one of the one or more dynamic routes and to store the association in a memory.

15. The system of claim 13, wherein the sorter is further configured to sort the plurality of items according to the sequence identifiers associated with the plurality of items, and to apply the sequence identifiers to the items.

16. The system of claim 13, wherein the inventory control processor is further configured to associate each of the plurality of items with a static route according to the destination for each of the plurality of items.

17. The system of claim 13, wherein the inventory control processor is further configured to group one or more static routes.

18. The system of claim 13, wherein the routing processor is further configured to generate the one or more dynamic routes based on which of the plurality of items have destinations within at least one of the groupings of static routes.

19. The system of claim 13, wherein the routing processor is further configured to generate the one or more dynamic routes based, at least in part, on item and destination information of items which are physically located at a unit delivery facility, and based, at least partially, on item and destination information of expected incoming items.

20. The system of claim 13, wherein the routing processor is further configured to generate the one or more dynamic routes based, at least in part, on availability of item processing and delivery resources at a delivery facility.

* * * * *